United States Patent
Choi et al.

(10) Patent No.: US 8,982,365 B2
(45) Date of Patent: Mar. 17, 2015

(54) IMAGE FORMING APPARATUS AND METHOD OF IMAGE FORMING

(71) Applicant: Samsung Electronics Co., Ltd, Suwon-si (KR)

(72) Inventors: Young-min Choi, Seoul (KR); Gun-ho Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/958,669

(22) Filed: Aug. 5, 2013

(65) Prior Publication Data

US 2014/0240734 A1 Aug. 28, 2014

(30) Foreign Application Priority Data

Feb. 22, 2013 (KR) .................. 10-2013-0019251

(51) Int. Cl.
  *G06K 15/00* (2006.01)
  *G06F 3/12* (2006.01)
  *H04N 1/23* (2006.01)
  *H04N 1/00* (2006.01)

(52) U.S. Cl.
  CPC .............. *H04N 1/2369* (2013.01); *G06K 15/00* (2013.01); *H04N 1/00933* (2013.01); *H04N 2201/0093* (2013.01); *H04N 2201/0094* (2013.01); *H04N 2201/0091* (2013.01); *H04N 2201/0082* (2013.01)
  USPC .......................... 358/1.12; 358/1.13; 358/1.14

(58) Field of Classification Search
  None
  See application file for complete search history.

(56) References Cited

U.S. PATENT DOCUMENTS

| | | | | |
|---|---|---|---|---|
| 5,812,901 A * | 9/1998 | Morikawa | ....................... | 399/19 |
| 7,073,436 B2 * | 7/2006 | Takahashi | ..................... | 101/229 |
| 7,349,109 B2 * | 3/2008 | Sugishita | ..................... | 358/1.13 |
| 8,220,897 B2 * | 7/2012 | Robinson et al. | ............... | 347/19 |
| 8,500,236 B2 * | 8/2013 | Robinson et al. | ............... | 347/19 |
| 2007/0030514 A1 * | 2/2007 | Shima | .......................... | 358/1.15 |
| 2012/0154471 A1 * | 6/2012 | Ren et al. | ......................... | 347/16 |
| 2014/0002531 A1 * | 1/2014 | Mo et al. | .......................... | 347/16 |
| 2014/0119751 A1 * | 5/2014 | Yasuzaki | ......................... | 399/38 |

* cited by examiner

*Primary Examiner* — Satwant Singh
(74) *Attorney, Agent, or Firm* — Staas & Halsey LLP

(57) ABSTRACT

An image forming apparatus includes an input unit to receive printing data, a controller to determine a duplex printing mode to be applied to the printing data from among a plurality of duplex printing modes and an engine waiting time according to a feature of the input printing data and performance of the image forming apparatus, an image processor to perform image-processing of the input printing data, and an image former to print the image-processed printing data based on the determined duplex printing mode and the determined engine waiting time.

24 Claims, 11 Drawing Sheets

(a)

IMAGE FORMING APPARATUS AND METHOD OF IMAGE FORMING

CROSS-REFERENCE TO RELATED APPLICATIONS

This application claims priority under 35 U.S.C. §119(a) from Korean Patent Application No. 10-2013-0019251, filed on Feb. 22, 2013, in the Korean Intellectual Property Office, the disclosure of which is incorporated herein by reference in its entirety.

BACKGROUND OF THE INVENTION

1. Field of the Invention

Apparatuses and methods consistent with the present general inventive concept relate to an image forming apparatus and method, and more particularly, to an image forming apparatus capable of effectively performing duplex printing by adjusting a printing waiting time, and an image forming method thereof.

2. Description of the Related Art

An image forming apparatus is a device which prints printing data generated by a terminal device, such as a computer, on printing paper. Examples of an image forming apparatus include copiers, printers, facsimile machines, and multifunction peripherals (MFPs) which implement the functions of the aforementioned machines in a single device.

In order to perform duplex printing in the related art, the user has to manually feed one-side-printed paper into an image forming apparatus. However, since recent image forming apparatuses have a paper path to switch printing side of paper, duplex printing can be performed without the user's intervention.

The duplex printing may be separated into batch 1 and batch 2, according to how printing is performed on paper on the printing path. In batch 1, after duplex printing is performed on both sides of a sheet of printing paper, duplex printing is performed on both sides of a subsequent sheet of printing paper. In batch 2, duplex printing is performed alternately on a plurality of sheets of printing paper.

Recent image forming apparatuses basically perform duplex printing in batch 2, performing duplex printing on a plurality of printing papers at once, in order to satisfy the specifications of a high-speed engine. During duplex printing, when data to print are input later than a predetermined time, more specifically, when data which are needed for subsequent printing are not input to a printing engine within a fixed printing waiting time, the image forming apparatus changes into batch 1, in which duplex printing is performed on one printing paper at a time, and keeps on duplex printing.

However, problems with this printing method include when duplex printing changes from batch 2 to batch 1, the print speed may be slowed.

SUMMARY OF THE INVENTION

The present general inventive concept provides an image forming apparatus capable of effectively performing duplex printing by adjusting a printing waiting time, and an image forming method thereof.

Additional features and utilities of the present general inventive concept will be set forth in part in the description which follows and, in part, will be obvious from the description, or may be learned by practice of the general inventive concept.

Exemplary embodiments of the present general inventive concept provide an image forming apparatus having a plurality of duplex printing modes which are separated according to a processing unit of printing paper, the image forming apparatus including an input unit to receive printing data, a controller to determine a duplex printing mode to be applied to the printing data from among the plurality of duplex printing modes and an engine waiting time according to a feature of the input printing data and a performance of the image forming apparatus, an image processor to perform image-processing of the input printing data, and an image former to print the image-processed printing data based on the determined duplex printing mode and the determined engine waiting time.

The duplex printing modes may include a first duplex printing mode to perform printing on a single sheet of printing paper at a time, and second duplex printing mode to perform printing on two sheets of printing paper at a time.

The image processor may generate two printing images sequentially for each sheet of printing paper when the determined duplex printing mode is the first duplex printing mode, and the image processor may generate four printing images alternately for two sheets of printing paper at a time when the determined duplex printing mode is the second duplex printing mode.

The image former may complete duplex printing on a first sheet of printing paper and then perform duplex printing on a second sheet of printing paper when the determined duplex printing mode is the first duplex printing mode. The image former may perform printing on a first side of a second sheet of printing paper between printing on the first side of the first sheet of printing paper and printing on a second side of the first sheet of printing paper when the determined duplex printing mode is the second duplex printing mode.

The controller may determine the engine waiting time in consideration of at least one of an image processing speed of the image processor, a memory size of the image forming apparatus, a copying method, and a resolution of the printing data.

The controller may determine a printing command cycle, and determine the engine waiting time additionally in consideration of a weighting corresponding to the determined printing command cycle.

The controller may determine that the duplex printing mode to be applied to the printing data becomes the second duplex printing mode when the determined engine waiting time is smaller than a predetermined value, and the controller may determine that the duplex printing mode to be applied to the printing data becomes the first duplex printing mode when the determined engine waiting time is greater than the predetermined value.

The image forming apparatus may further include a paper feeder to feed the printing paper into the image former along a paper feeding path, wherein the controller controls the paper feeder to delay feeding of the printing paper into the image former when the determined engine waiting time is greater than a default printing waiting time.

The paper feeder may re-feed one-side-printed printing paper into the image former after the image former has printed on a first side of the printing paper, and the controller may control the paper feeder to change a time of re-feeding the printing paper into the image former or change moving speed of the printing paper on the paper feeding path when the determined engine waiting time is greater than the default printing waiting time.

The image forming apparatus may further include a communication interface to communicate with a host device. The input unit may receive the printing data from the host device through the communication interface.

The image forming apparatus may further include a scanner which scans a document and generates a scan image. The input unit may receive the scan image generated by the scanner as the printing data.

Exemplary embodiments of the present general inventive concept also provide an image forming method of an image forming apparatus having a plurality of duplex printing modes which are separated according to a processing unit of printing paper includes receiving printing data, determining a duplex printing mode to be applied to the printing data from among the plurality of duplex printing modes and an engine waiting time according to a feature of the input printing data and performance of the image forming apparatus, performing image-processing of the input printing data, and printing the image-processed printing data based on the determined duplex printing mode and the determined engine waiting time.

The duplex printing modes may include a first duplex printing mode to perform printing of a single sheet of printing paper at a time, and a second duplex printing mode to perform printing of two sheets of printing paper at a time.

Performing of image-processing may include generating two printing images sequentially on each printing paper when the determined duplex printing mode is the first duplex printing mode, and generating four printing images alternately on two sheets of printing paper at a time when the determined duplex printing mode is the second duplex printing mode.

Printing of the image-processed printing data may include performing duplex printing on a single sheet of printing paper at a time when the determined duplex printing mode is the first duplex printing mode, and performing printing on a first side of a second sheet of printing paper between printing on a first side of a first sheet of printing paper and printing on a second side of the first sheet of printing paper when the determined duplex printing mode is the second duplex printing mode.

The determining of the duplex printing mode may include determining the engine waiting time in consideration of at least one of an image processing speed of an image processor, a memory size of the image forming apparatus, a copying method, and a resolution of the printing data.

The determining of the duplex printing mode may include determining a printing command cycle, and determining the engine waiting time additionally in consideration of a weighting corresponding to the determined printing command cycle.

Determining of the duplex printing mode may include determining the duplex printing mode to be applied to the printing data as the second duplex printing mode when the determined engine waiting time is smaller than a predetermined value, and determining the duplex printing mode to be applied to the printing data as the first duplex printing mode when the determined engine waiting time is greater than the predetermined value.

Printing of the image-processed printing data may include delaying feeding of the printing paper into an image former when the determined engine waiting time is greater than a default printing waiting time.

Printing of the image-processed printing data may include changing a time of re-feeding the printing paper into the image former after printing on a first side of the printing paper or changing a moving speed of the printing paper on the paper feeding path when the determined engine waiting time is greater than the default printing waiting time.

Receiving of the printing data may include receiving the printing data from a host device.

Receiving of the printing data may include scanning a document, generating a scan image, and receiving the generated scan image as the printing data.

A non-transitory computer-readable recording medium may contain computer-readable codes as a program to execute the image forming method.

Exemplary embodiments of the present general inventive concept also provide an image forming apparatus including an input unit to receive printing data, a controller to determine an engine waiting time according to a feature of the input printing data and a performance of the image forming apparatus, and to select a duplex printing mode to be applied to the printing data from among a plurality of duplex printing modes based on the determined engine waiting time, and an image former to print the printing data based on the determined duplex printing mode and the determined engine waiting time.

The performance of the image forming apparatus may include at least one of an image processing speed of the image forming apparatus, a memory size of the image forming apparatus, and a cycle time of duplex printing in the image forming apparatus according to one of the plurality of duplex printing modes.

The controller may select the duplex printing mode by comparing the determined engine waiting time to a preset engine waiting time.

The controller may select a duplex printing mode of performing duplex printing on a plurality of printing mediums at a time when the determined engine waiting time is less than or equal to the preset engine waiting time, and the controller may select a duplex printing mode of performing duplex printing on one printing medium at a time when the determined engine waiting time is greater than the preset engine time.

Exemplary embodiments of the present general inventive concept also provide an image forming method including receiving printing data, determining an engine waiting time according to a feature of the input printing data and a performance of an image forming apparatus, selecting a duplex printing mode to be applied to the printing data from among a plurality of duplex printing modes based on the determined engine waiting time, and printing the printing data at the image forming apparatus based on the determined duplex printing mode and the determined engine waiting time.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
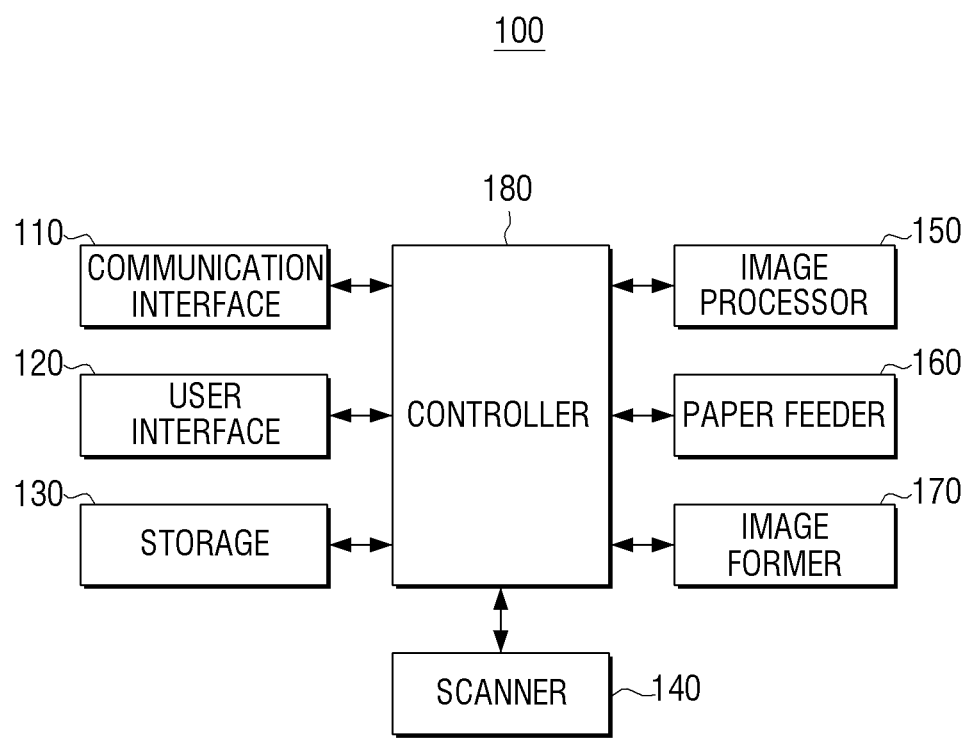
FIG. 1 is a block diagram illustrating a configuration of an image forming apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the following description, such as detailed construction and elements, are provided to assist in a comprehensive understanding of the invention. Thus, it is apparent that the exemplary embodiments of the present general inventive concept can be carried out without those specifically defined matters. Also, well-known functions or constructions are not described in detail since they would obscure the present general inventive concept with unnecessary detail.

FIG. 1 is a block diagram of a configuration of an image forming apparatus 100 according to an exemplary embodiment of the present general inventive concept.

As illustrated in FIG. 1, the image forming apparatus 100 may include a communication interface 110, a user interface 120, a storage 130, a scanner 140, an image processor 150, a paper feeder 160, an image former 170, and a controller 180. The image forming apparatus 100 according to the present exemplary embodiment of the present general inventive concept may be a printer, a copier, a facsimile machine, or a multifunction peripheral (MFP).

The communication interface 110 connects the image forming apparatus 100 with a host device (not illustrated), and may access the host device (not illustrated) through a universal serial bus (USB) port or a wireless port as well as through a local area network (LAN) or an internet. The host device may be representatively a printing control terminal device such as a personal computer (PC), notebook computer, tablet PC, smart phone, and portable multimedia player (PMP).

In addition, the communication interface 110 receives printing data. The printing data may be data made in printer languages such as postscript (PS) and printer control language (PCL), or may be a file itself such as PDF, XPS, BMP, JPG, and TXT files when the image forming apparatus 100 supports direct printing.

In addition, the communication interface 110 transmits scan data scanned by the scanner 140 or a scan image processed by the image processor 150 to an external device (not illustrated).

The user interface 120 provides a plurality of function keys (not illustrated) which allow the user to set or select diverse functions supported by the image forming apparatus 100, and displays diverse information provided by the image forming apparatus 100. The user interface 120 may be implemented with a device which realizes input and output at the same time, such as a touch screen, or be implemented with a combination of a mouse and a monitor.

The user interface 120 receives input of a job performing command. The job performing command may be a copy command to scan and print a document, or a printing command to print a file stored in the image forming apparatus 100. In this exemplary embodiment of the present general inventive concept, the job performing command is input through the user interface 120. However, when a job performing command is a printing command to print printing data or a fax transmission command to print printing data, the job performing command may be input through the communication interface 110.

In addition, the user interface 120 receives input of a printing method with an input job performing command. The printing method relates to whether to perform single-sided printing or duplex printing. When the job performing command is a copy command, the printing method may be one of single-sided printing of a single-sided scan job, duplex printing of a single-sided scan job, single-sided printing of a double-sided scan job, and duplex printing of a double-sided scan job.

When the job performing command is a printing command to print printing data, the printing method may be input through the communication interface 110, and may be one of double-sided printing and single-sided printing. In this exemplary embodiment of the present general inventive concept, as examples of the printing method, only double-sided printing and single-sided printing have been provided and described. However, in an implementation, the printing method may include diverse printing options such as whether to perform n-up, and adjusting a printing quality. However, since the present general inventive concept relates to a method of processing duplex printing, it is assumed that the printing method selected by the user is duplex printing.

The storage 130 stores printing data received through the communication interface 110. The storage 130 may be implemented with an internal storage medium of the image forming apparatus 100 and an external storage medium, for example, a removable disk including a USB memory, and a web server through a network.

Figure 4:
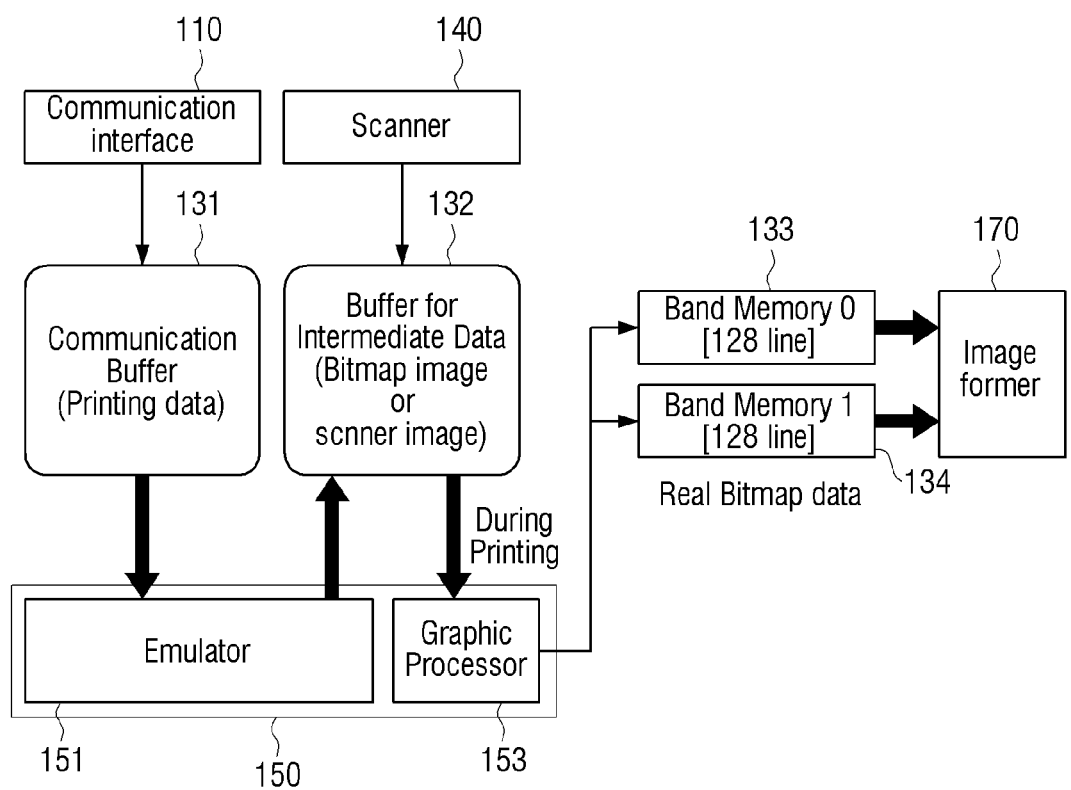
FIG. 4 illustrates operation of the image processor illustrated in FIG. 1.

The storage 130 includes a plurality of buffers (131 through 134, illustrated in FIG. 4). More specifically, the storage 130 stores a scan image generated by the scanner 140, or temporarily stores printing data processed into an image by the image processor 150 into the plurality of buffers 131-134. In this exemplary embodiment of the present general inventive concept, the storage 130 includes the plurality of buffers 131-134. However, in an implementation, the plurality of buffers 131-134 may be implemented with components of the image processor 150 and the image former 170.

The scanner 140 scans a document. More specifically, when a job performing command of the user is a scan command, a copy command, or a fax transmission command, the scanner 140 scans a document and generates a scan image. In this exemplary embodiment of the present general inventive concept, the scanner 140 is illustrated and described as a component of the image forming apparatus 100. However, if the image forming apparatus 100 is a printer capable of only printing, the scanner 140 may be omitted.

The scanner 140 may include a single scanning module or a plurality of scanning modules. When the scanner 140 includes only a single scanning module, the scanner 140 has an automatic document feeder (ADF) which automatically feeds paper into the scanner 140 and thereby can continually perform double-sided scanning of a plurality of sheets of paper. Although the exemplary embodiments of the present general inventive concept described herein are directed to using sheets of paper, it will be understood that the present general inventive concept may be applied to any printing medium on which duplex printing is performed.

The image processor 150 processes input printing data and generates binary data corresponding to the printing data. More specifically, when the image processor 150 receives printing data through the communication interface 110, the image processor 150 generates a bitmap image by parsing and rendering the received printing data, performs halftoning of the generated bitmap image, and generates binary data to be processed by the image former 170.

When the image processor 150 receives a scan image through the scanner 140, the image processor 150 performs halftoning of the received scan image and generates binary data to be processed by the image former 170. Hereinbelow, in order to facilitate description, the communication interface 110 and the scanner 140 are collectively referred to as an input unit, and printing data received through the communication interface 110, scan images received through the scanner 140, and files pre-stored in the storage 130 are collectively referred to as printing data.

If the image forming apparatus 100 is capable of color printing, the image processor 150 performs color conversion of a generated bitmap image or a scan image, and generates a plurality of binary data (for example, CMYK binary data) of the converted bitmap image or the converted scan image.

In this exemplary embodiment of the present general inventive concept, it is described that the image processor 150 only generates binary data. However, the image processor 150 performs image processing which general image forming apparatuses or image reading apparatuses perform to improve printing quality. In addition, in this exemplary embodiment of the present general inventive concept, the image processor 150 generates binary data. However, if the image former 170 can express a single pixel in a plurality of gray scale values, the image processor 150 can generate multi-bit data having a plurality of values for the single pixel.

When a received printing data or a scanned image has a plurality of pages, the image processor 150 generates binary data for each page by the aforementioned process.

At this time, when the printing method of the plurality of pages is duplex printing, the image processor 150 generates binary data for each of the plurality of pages in the order corresponding to a duplex printing mode which is determined by the controller 180. More specifically, when the determined duplex printing mode is a first duplex printing mode, the image processor 150 generates two printing images sequentially for each printing paper, or when the determined duplex printing mode is a second duplex printing mode, the image processor 150 generates four printing images alternately for two sheets of printing paper. The operation of generating a page using the image processor 150 will be described later in greater detail with reference to FIGS. 2A and 2B.

The paper feeder 160 feeds printing paper into the image former 170 along a paper feeding path. Detailed configuration and operation of the paper feeder 160 will be described later with reference to FIG. 3.

The image former 170 prints printing data processed into an image. More specifically, the image former 170 may print binary data received from the image processor 150 based on the duplex printing mode determined by the controller 180 or an engine waiting time. For example, when the determined duplex printing mode is the first duplex printing mode, the image former 170 completes duplex printing on a single sheet of printing paper and then performs duplex printing on a subsequent sheet of printing paper. In addition, when the determined duplex printing mode is the second duplex printing mode, the image former 170 performs printing on a first side of a second printing paper between printing on a first side of a first printing paper and printing on a second side of the first printing paper.

The controller 180 controls the components of the image forming apparatus 100. More specifically, when the controller 180 receives a job performing command through the communication interface 110 or the user interface 120, the controller 180 determines a duplex printing mode to be applied to the input printing data from among the plurality of duplex printing modes and an engine waiting time according to the features of the input printing data and the performance of the image forming apparatus 100. The method of determining the duplex printing mode and the engine waiting time will be described later in detail with reference to FIGS. 2A and 2B.

In addition, the controller 180 controls the image processor 150, the paper feeder 160, and the image former 170 to perform printing according to the determined duplex printing mode.

Accordingly, the image forming apparatus 100 according to an exemplary embodiment of the present general inventive concept may perform printing in the duplex printing mode capable of efficiently minimizing a printing time according to the features of printing data and the performance of the image forming apparatus 100.

Figure 2A:
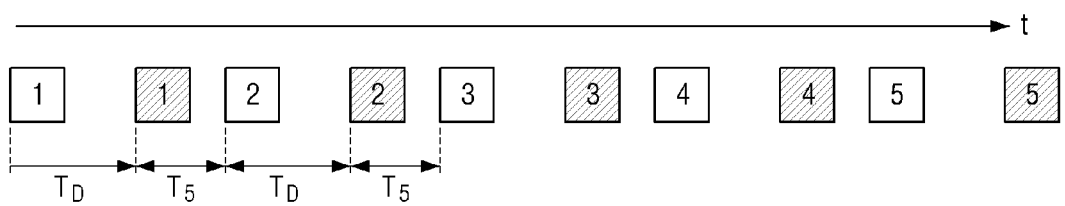
FIGS. 2A and B are views illustrating duplex printing modes according to an exemplary embodiment of the present general inventive concept.
Figure 2B:
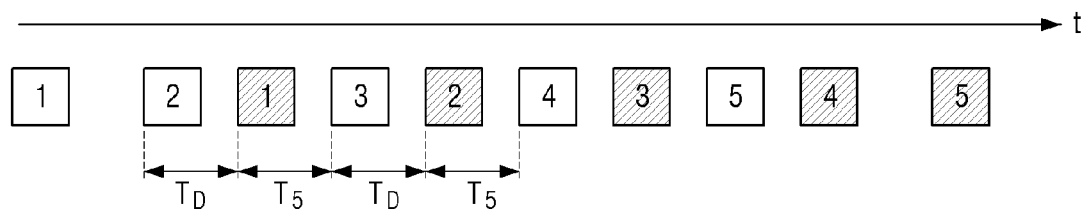

FIGS. 2A and B are views provided to describe duplex printing modes according to an exemplary embodiment of the present general inventive concept. More specifically, FIG. 2A illustrates a printing order of a plurality of pages in the first duplex printing mode, and FIG. 2B illustrates a printing order of a plurality of pages in the second duplex printing mode. In FIGS. 2A and 2B, $T_D$ represents a time between beginning printing on a first side of a printing paper and beginning printing on a second side of a printing paper. Similarly, $T_S$ represents the time between beginning printing on a second side of a printing paper and beginning printing on a first side of a printing paper.

With reference to FIG. 2A, in the first duplex printing mode, printing is performed on one sheet of printing paper at a time. More specifically, printing is performed on first side of a first printing paper and then on second side, and is subsequently performed on first side of a second sheet of printing paper and then on a second side.

For example, when first to fifth pages are printed, the second page is printed on the first side of a first sheet of printing paper, the first sheet of printing paper is reversed, the first page is printed on the second side of the first sheet of printing paper, the fourth page is printed on the first side of a second sheet of printing paper, the second sheet of printing paper is reversed, and the third page is printed on the second side of the second sheet of printing paper. Thus, printing is performed on one sheet of printing paper at a time, as illustrated in FIG. 2A, in which "1," "2," "3,", "4" and "5" respectively denote first through fifth sheets of printing paper, where a white box denotes the first side and cross-hatched lines denote the second side of the respective sheet.

Accordingly, when duplex printing is performed in the first duplex printing mode, the image processor 150 separates a plurality of printing pages into pairs of pages (that is, pairs which may be printed on a single sheet of printing paper in the manner described above), and processes the printing data into an image by the pairs of pages. The image processor 150 generates binary data of printing data corresponding to an even-numbered page of each pair of pages first and then generates binary data of printing data corresponding to an odd-numbered page of each pair of pages.

In this exemplary embodiment of the present general inventive concept, in order to generate a final printout in order of page, printing data corresponding to an even-numbered page are processed first and then printing data corresponding to an odd-numbered page are processed. However, in an implementation, printing data corresponding to an odd-numbered page may be processed first and then printing data corresponding to an even-numbered page may be processed. In addition, in an implementation, the image processor 150 may process printing data of the two pages in parallel at the same time.

With reference to FIG. 2B, in the second duplex printing mode, printing is performed on two sheets of printing paper at a time. More specifically, printing is performed on a first side of a second sheet of printing paper between printing on a first side of a first sheet of printing paper and printing on the second side of the first sheet of printing paper.

For example, when first to fifth pages are printed, the second page is printed on the first side of a first sheet of printing paper, and the first sheet of printing paper is reversed and re-fed by the paper feeder 160. While the first sheet of paper is being reversed and re-fed, the fourth page is printed on the first side of a second sheet of printing paper, and the second sheet of printing paper is reversed and re-fed by the paper feeder 160. While the second sheet of printing paper is being reversed and re-fed, the first page is printed on the second side of the re-fed first sheet of printing paper. The third page is then printed on the second side of the re-fed second sheet of printing paper. Thus, printing is performed on two sheets of printing paper at a time, as illustrated in FIG. 2B.

Accordingly, when duplex printing is performed in the second duplex printing mode, the image processor 150 separates a plurality of printing pages by the four pages (that is, by the two sheets of printing paper), and processes the printing data into an image by the four pages.

In this exemplary embodiment of the present general inventive concept, the duplex printing mode only includes the first and second duplex printing modes. However, in an implementation, the present general inventive concept may be applied to image forming apparatuses in which three or more sheets of printing paper are arranged on the paper path.

As mentioned above, in the second duplex printing mode, printing is performed on a first side of a second sheet of paper while a first sheet of paper is being reversed. Accordingly, the second duplex printing mode is more efficient than the first duplex printing mode.

However, in the related art, when a printing image is input to the image former 170 later than a fixed engine waiting time due to late generation of a scan image by duplex scanning, the duplex printing mode changes into the first duplex printing mode and printing is performed. For the purposes of this exemplary embodiment of the present general inventive concept, "engine waiting time" denotes a time an engine of the image former 170 waits for the next printing image, i.e., the next page of printing data to print.

However, when generation of the scan image and the image processing speed exceeds the fixed engine waiting time slightly, adjusting the engine waiting time and performing printing in the second duplex printing mode is faster and more efficient than changing the duplex printing mode.

Accordingly, the image forming apparatus 100 according to this exemplary embodiment of the present general inventive concept may determine a duplex printing mode to be applied to the input printing data from among a plurality of duplex printing modes, and an engine waiting time according to the features of the input printing data and the performance of the image forming apparatus 100.

More specifically, the image forming apparatus 100 determines an engine waiting time in consideration of image processing speed, memory size, copying method, and resolution of the printing data. When the determined engine waiting time satisfies Mathematical Formula 1 below (more specifically, when the determined engine waiting time is smaller than T3), the image forming apparatus 100 determines that a duplex printing mode to be applied to the input printing data becomes the second duplex printing mode. When the determined engine waiting time does not satisfy Mathematical Formula 1, the image forming apparatus 100 determines that the duplex printing mode becomes the first duplex printing mode.

$$T1 \leq \text{WaitingTime} \leq T3 \qquad \text{[Mathematical Formula 1]}$$

Herein, T1 denotes a cycle time of a duplex even-numbered page capable of the best performance determined by the specifications of the image forming device 100, T3 denotes a maximum cycle time of a duplex even-numbered page according to the second duplex printing mode which is more effective than a duplex even-numbered page printed according to the first duplex printing mode determined by the specifications of image forming device 100. In addition, the waiting time is a time determined by Mathematical Formula 2 below:

$$\text{WaitingTime} = \frac{(T1*F2) + (T1*F3) + (T1*F4)}{3} \qquad \text{[Mathematical Formula 2]}$$

Herein, T1 is determined by a process processing speed of the system, F2 denotes a value corresponding to the size of memory installed in the system, F3 denotes a value corresponding to copying method, and F4 denotes a value corresponding to the resolution of the printing data. Examples of the values of F2, F3, and F4 are illustrated in Table 1 below.

TABLE 1

| Memory size | | Copy method | | Resolution | |
| --- | --- | --- | --- | --- | --- |
| Classification | Factor(F2) | Classification | Factor(F3) | Classification | Factor(F4) |
| ~512 MB | 2 | 1-1 Copy | 1 | 600 * 600 * 1 bit | 1 |
| 512 Mb~1G | 1.5 | 1-2 Copy | 1.5 | 600 * 600 * 2 bit | |
| 1G~2G | 1.2 | 2-1 Copy | 1 | 1200 * 600 * 2 bit | 1.5 |
| Above 2G | 1 | 2-2 Copy | 2 | 1200 * 1200 * 2 bit | 2 |

The printing waiting time may be adjusted according to a printing command cycle. More specifically, the image forming apparatus 100 determines the printing command cycle, calculates a weighting corresponding to the determined printing command cycle using Mathematical Formula 3 below, puts the calculated weighting into Mathematical Formula 4 below, and thereby obtains the printing waiting time.

$$\text{Weighting}(\beta) = \frac{\sum_{N-M}^{N-1} TransmissionTime/M}{T1} \quad \text{[Mathematical Formula 3]}$$

Herein, the weighting (β) is an average time of previous printing command transmission cycles such as N-3, N-2, and N-1. M denotes the total number of printing command transmission cycles.

$$WaitingTime = \frac{(T1*F2) + (T1*F3) + (T1*F4)}{3} * \text{Weighting}(\beta) \quad \text{[Mathematical Formula 4]}$$

When the duplex printing mode and the engine waiting time are determined as described above, the controller 180 controls the image processor 150, the paper feeder 160, and the image former 170 to perform printing according to the duplex printing mode and the determined engine waiting time.

More specifically, when the second duplex printing mode is determined and the engine waiting time is adjusted longer than a default printing waiting time, the controller 180 controls the paper feeder 160 to delay feeding printing paper into the image former 170. For example, the controller 180 may change reverse timing of feeding one-side-printed printing paper into the image former 170 or change moving speed of the printing paper (that is, speed of a motor, not illustrated) on the paper feeding path.

Figure 3:
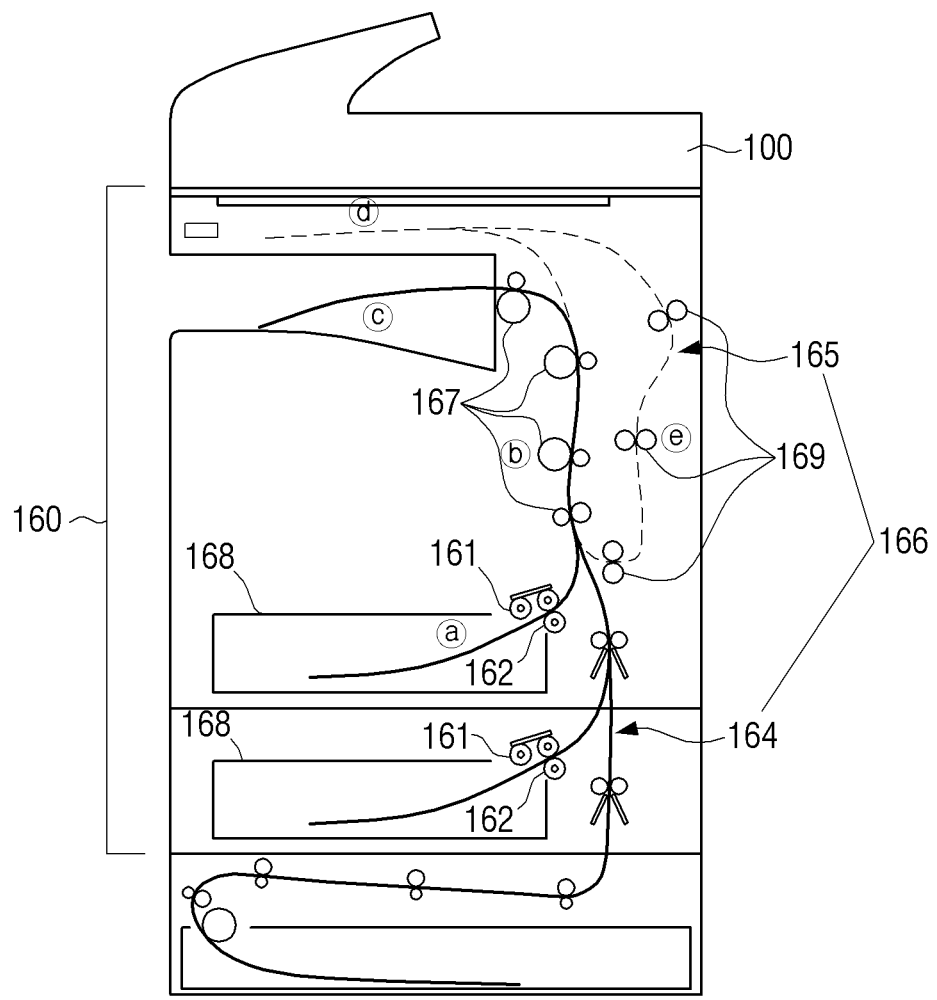
FIG. 3 illustrates configuration and operation of the paper feeder illustrated in FIG. 1.

FIG. 3 illustrates configuration and operation of the paper feeder 160 illustrated in FIG. 1.

With reference to FIG. 3, the paper feeder 160 may include a plurality of rollers 162, 167, and 169 and a plurality of sensors 161 to feed printing paper on a paper feeding path 166. The paper feeding path 166 is a path to move printing paper, which includes a first paper feeding path 164 to perform printing, and a second paper feeding path 165 (or a reverse path) to re-feed printing paper that is only printed on one side on the first paper feeding path 164.

Based on this structure, the process of moving printing paper in the single-sided printing is described here. When a paper detecting sensor 161 senses the presence of printing paper in a carrying box 168, a sheet of printing paper in the carrying box 168 is fed on the first paper feeding path 164 by the feeding roller 162. Subsequently, the fed printing paper moves along the first paper feeding path 164 by a plurality of rollers 167, and printing is performed on one side of the printing paper. The one-side-printed paper is discharged. In the one-sided printing, the paper feeding path 166 of the printing paper follows (a)→(b)→(c), as indicated by the corresponding letters in FIG. 3.

In addition, the process of moving printing paper in the duplex printing is described here. The movements of printing paper in the duplex printing is described separately in the first duplex printing mode and the second duplex printing mode.

Firstly, in the first duplex printing mode, only a single sheet of printing paper is placed on the paper feeding path 166. More specifically, when the paper detecting sensor 161 senses the presence of printing paper in the carrying box 168, a sheet of printing paper in the carrying box 168 is fed on the first paper feeding path 164 by the feeding roller 162. Subsequently, the fed printing paper moves along the first paper feeding path 164 by a first plurality of rollers 167, and printing is performed on one side of the printing paper. The one-side-printed paper is moved onto the second paper feeding path 165, and moves along the second paper feeding path 165 by a second plurality of rollers 169. Then, the one-side-printed paper is re-fed on the first paper feeding path 164. Since the second paper feeding path 165 is rotated 180 degrees as illustrated in FIG. 3, the re-fed printing paper is reversed. Accordingly, the re-fed printing paper moves along the first paper feeding path 164 again, and printing is performed on the other side. The both-side-printed paper is discharged. In the duplex printing, the paper feeding path of the printing paper follows (a)→(b)→(d)→(e)→(b)→(c), as indicated by the corresponding letters in FIG. 3.

In the second duplex printing mode, two sheets of printing paper are placed on the paper feeding path 166. The paper feeding path 166 of each sheet is the same as that in the first duplex printing mode. However, when the second sheet of printing paper is fed on the first paper feeding path 164, the first sheet of printing paper is placed on the second paper feeding path 165, and when printing is performed on the second sheet of printing paper, the first sheet of printing paper moves along the second paper feeding path 165.

In the second duplex printing mode, while a printing paper moves on the second paper feeding path 165, printing is performed on another printing paper. Accordingly, printing speed in the second duplex printing mode is faster than that in the first duplex printing mode.

However, if a printing image of a subsequent page is not provided to the image former 170 within the default engine waiting time due to late image processing speed of the image processor 150 or shortage of capacity of the memory, the image forming apparatus 100 according to this exemplary embodiment of the present general inventive concept may adjust the engine waiting time and control the paper feeder 160 to delay feeding of the printing paper into the image former 170.

More specifically, the image forming apparatus 100 may lengthen a paper interval by changing a timing to re-feed printing paper placed on the second paper feeding path 165, or may slow a moving speed of printing paper by changing a driving speed of a plurality of motors (not illustrated) located on the paper feeding path 166. The paper interval indicates the distance between printing papers.

FIG. 4 illustrates operation of the image processor 150 illustrated in FIG. 1.

With reference to FIG. 4, the image processor 150 may include an emulator 151 and a graphic processor 153.

Printing data received through the communication interface 110 may be temporarily stored in a first buffer 131, which may be called a communication buffer. The emulator 151 performs parsing and rendering of the printing data, and thereby generates a bitmap image. The generated bitmap image, or an image generated by the scanner 140, may be temporarily stored in a second buffer 132, which may be called a buffer for intermediate data.

The graphic processor 153 performs image-processing of the bitmap image and thereby generates binary data. More specifically, the graphic processor 153 reads out the bitmap image provided by the emulator 151 or the scan image provided by the scanner 140 from the second buffer 132 and performs image-processing.

In addition, the graphic processor 153 transmits the generated binary data to the image former 170. The transmitted binary data may be temporarily stored in a plurality of buffers 133 and 134, corresponding to Band Memory 0 and Band Memory 1, respectively, in FIG. 4.

Figure 5:
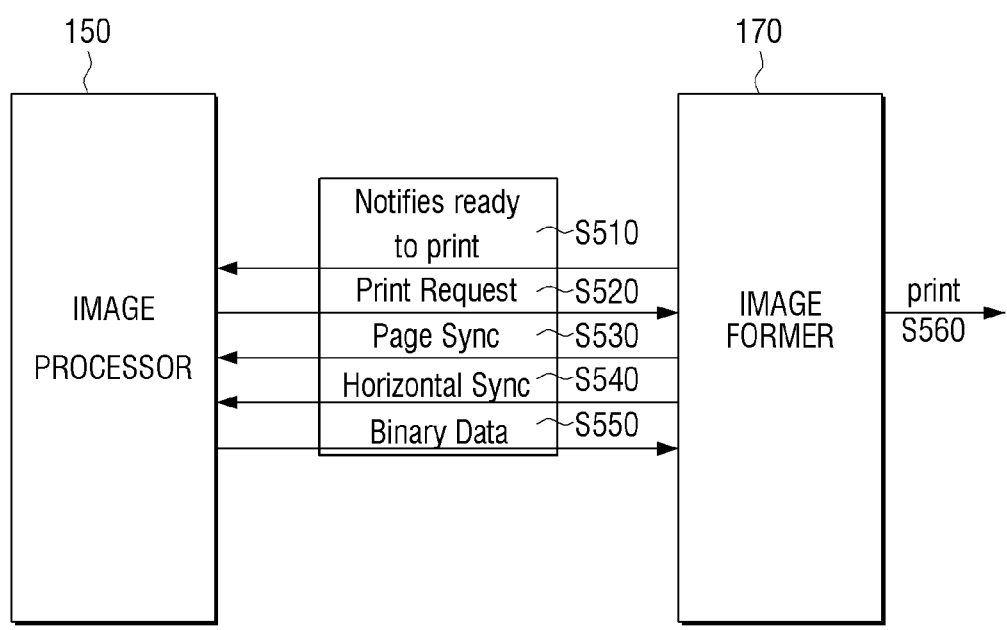
FIG. 5 illustrates operation between the image processor and the image former which are illustrated in FIG. 1.

FIG. 5 illustrates operations between the image processor 150 and the image former 170 which are illustrated in FIG. 1.

With reference to FIG. 5, when the image processor 150 transmits a printing command to the image former 170, the image processor 150 transmits an image at a printable time according to timing sequence as illustrated in FIG. 5 and the image former 170 receives corresponding data and performs printing.

More specifically, the image former 170 which is ready to print notifies its state to the image processor 150 in operation S510. The image processor 150 receives the information and transmits a printing request to the image former 170 in operation S520, and the image former 170 transmits a page sync and a horizontal sync to the image processor 150 accordingly in operations S530 and S540. The image processor 150 transmits binary data to the image former 170 based on the received page sync and horizontal sync in operation S550, and the image former 170 performs printing using the binary data in operation S560.

Figure 6:
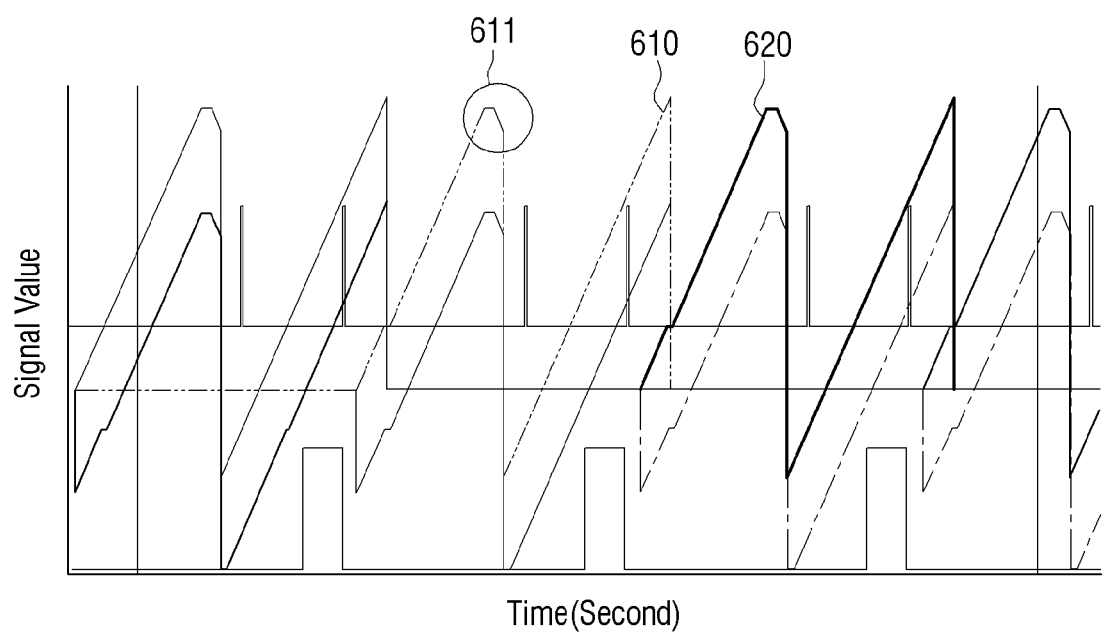
FIG. 6 is an operational timing chart of the image forming apparatus in the first duplex printing mode according to an exemplary embodiment of the present general inventive concept.
Figure 7:
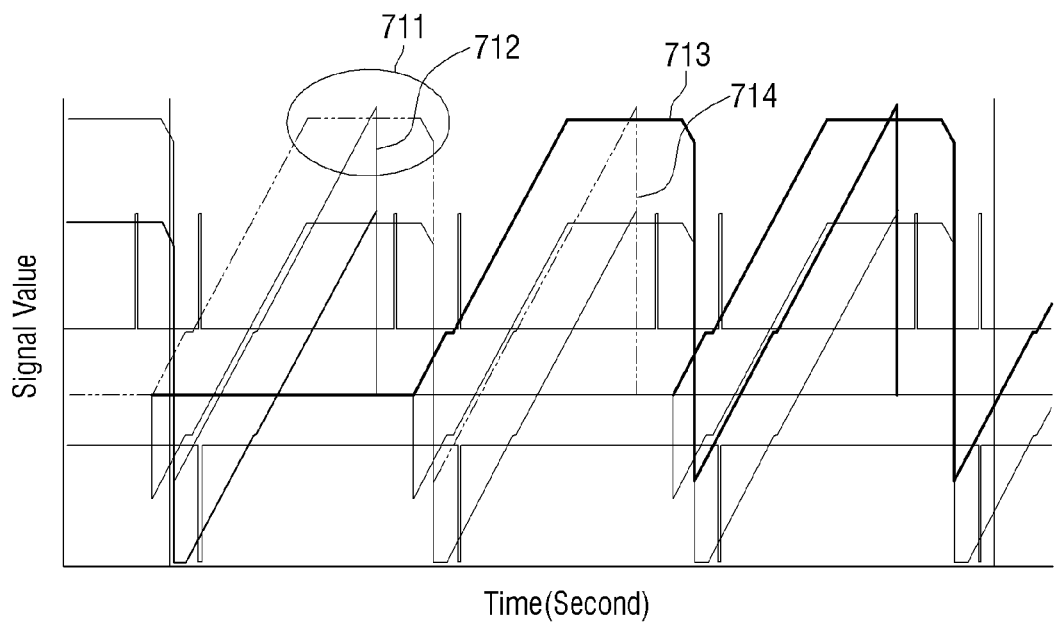
FIG. 7 is an operational timing chart of the image forming apparatus in the second duplex printing mode according to an exemplary embodiment of the present general inventive concept.

FIG. 6 is an operational timing chart of the image forming apparatus 100 in the first duplex printing mode according to an exemplary embodiment of the present general inventive concept, and FIG. 7 is an operational timing chart of the image forming apparatus 100 in the second duplex printing mode according to an exemplary embodiment of the present general inventive concept. More specifically, FIG. 6 is an operational timing chart showing when 100 pages (50 sheets of printing paper) are printed in a conventional duplex printing method (that is, in the first duplex printing mode), and FIG. 7 is an operational timing chart showing when printing is performed in the second duplex printing mode by adjusting the engine waiting time in the same condition.

With reference to FIG. 6, in the first duplex printing mode, after printing is performed on a first sheet of printing paper, printing is performed on a second sheet of printing paper. Area 611 indicates that the printed paper with printing on the first side is re-fed on the second paper feeding path 165 without delay. Area 610 indicates the printing of the second side of the first sheet of printed paper, and area 620 indicates the printing of the first side of the second sheet of printed paper, which like the first sheet, is then re-fed and printed on a second side.

With reference to FIG. 7, in the second duplex printing mode, after printing is performed on a first side of a first sheet of printing paper, printing is performed on a first side of a second sheet of printing paper. Area 711 shows that the first printed paper with printing on a first side is re-fed on the second paper feeding path 165 with delay of a predetermined time. During this time, as indicated by area 712, a first side of a second paper is printed. This second paper is re-fed with a delay of a predetermined time in area 713, during which time the second side of the first paper is printed, as indicated by area 714.

Since the printing paper is delayed on the second paper feeding path 165 for a predetermined time, a printing time for both sides of a single sheet of the printing paper may be lengthened. However, printing speed of a plurality of pages in the second duplex printing mode may cause approximately 30% faster performance than that in the first duplex printing mode.

As described above, the image forming apparatus 100 according to the exemplary embodiment of the present general inventive concept performs printing in the second duplex printing mode by adjusting the engine waiting time (or the paper interval) even when an image processing time is lengthened so that the image forming apparatus 100 can maintain printing performance at an optimum speed.

Furthermore, stop of the engine, irregular pickup time, or irregular paper-feeding time can be prevented by adjusting the engine waiting time so that the life span of the components of the image forming apparatus 100 may be increased and the output speed felt by the user can be increased.

Figure 8:
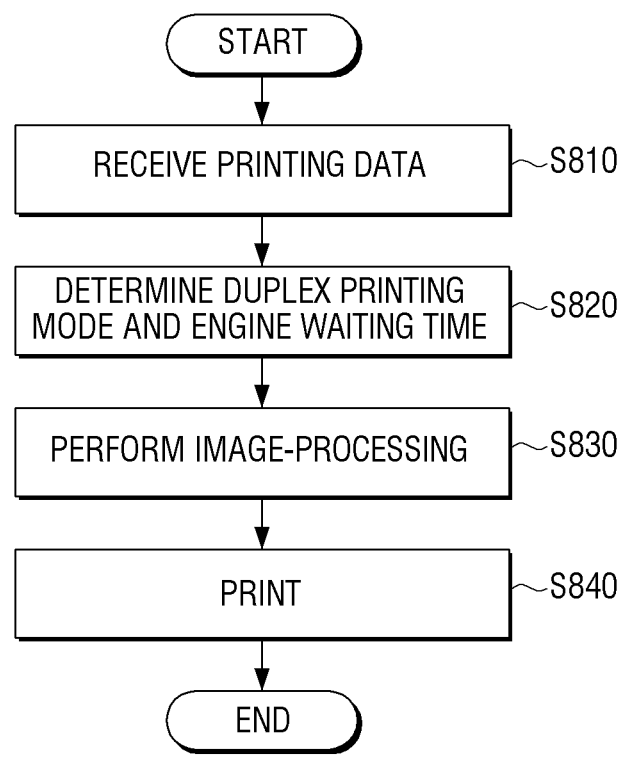
FIG. 8 is a flow chart illustrating an image forming method according to an exemplary embodiment of the present general inventive concept.

FIG. 8 is a flow chart illustrating an image forming method according to an exemplary embodiment of the present general inventive concept.

With reference to FIG. 8, in operation S810, the image forming apparatus 100 receives printing data. More specifically, the image forming apparatus 100 receives printing data from a host device (not illustrated), or receives a scan image obtained by scanning a document, as printing data.

In operation S820, according to the features of the input printing data and the performance of the image forming apparatus 100, the image forming apparatus 100 determines a duplex printing mode to be applied to the printing data from among a plurality of duplex printing modes, and an engine waiting time. More specifically, the image forming apparatus 100 determines the engine waiting time in consideration of criteria such as image processing speed, memory size, copying method, and resolution of the printing data. When the determined engine waiting time is smaller than a predetermined engine waiting time T3, the image forming apparatus 100 determines that the duplex printing mode to be applied to the input printing data becomes the second duplex printing mode. When the determined engine waiting time is greater than the predetermined engine waiting time T3, the image forming apparatus 100 determines that the duplex printing mode becomes the first duplex printing mode.

In operation S830, the image forming apparatus 100 performs image-processing of the input printing data, thereby generating binary data corresponding to the input printing data. At this time, when the printing data includes a plurality of pages, the image forming apparatus 100 generates binary data for each of the plurality of pages in the order corresponding to the determined duplex printing mode. For example, when the determined duplex printing mode is the first duplex printing mode, the image forming apparatus 100 generates two printing images sequentially for each sheet of printing paper, or when the determined duplex printing mode is the second duplex printing mode, the image forming apparatus 100 generates four printing images alternately for two sheets of printing paper.

In operation S840, based on the determined duplex printing mode and the determined engine waiting time, the image forming apparatus 100 prints the image-processed printing data. More specifically, the generated binary data are printed based on the determined duplex printing mode and the determined engine waiting time. For example, when the determined duplex printing mode is the first duplex printing mode, the image forming apparatus 100 has completed duplex printing on a single sheet of printing paper and then performs duplex printing on a subsequent sheet of printing paper. In addition, when the determined duplex printing mode is the second duplex printing mode, the image forming apparatus 100 performs printing on a first side of a second sheet of printing paper between printing on a first side of a first sheet of printing paper and printing on a second side of the first sheet of printing paper.

Accordingly, in a printing control method according to this exemplary embodiment of the present general inventive concept, printing may be performed in the duplex printing mode capable of efficiently minimizing a printing time according to the features of printing data and the performance of the image forming apparatus 100. The image forming method as illustrated in FIG. 8 may be executed by the image forming apparatus 100 having a configuration as illustrated in FIG. 1, and may be executed by image forming apparatuses having other configurations.

Figure 9:
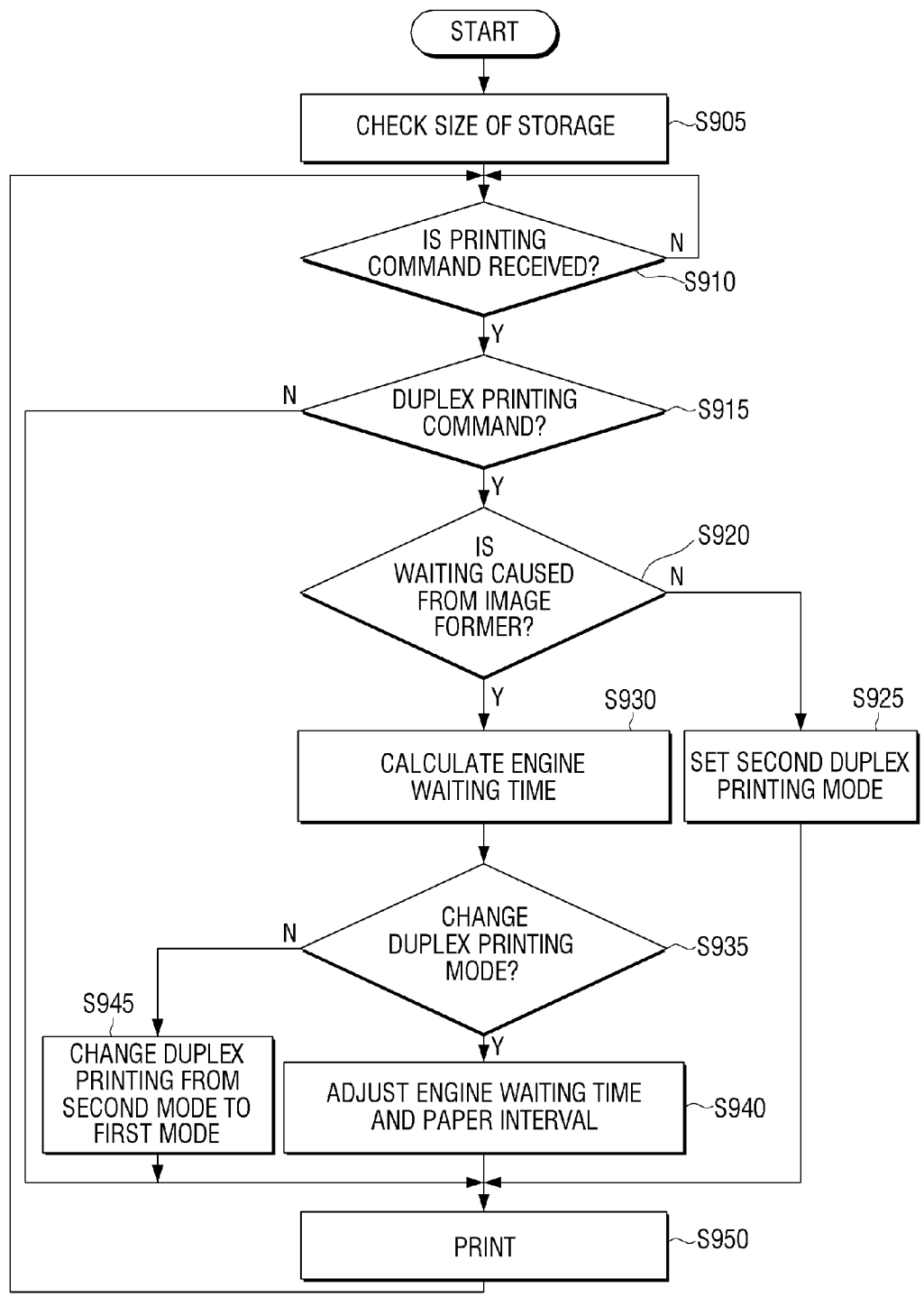
FIG. 9 is a flow chart illustrating an image forming method in detail when the user gives a printing command according to an exemplary embodiment of the present general inventive concept.

FIG. 9 is a flow chart illustrating an image forming method in detail when the user gives a printing command.

With reference to FIG. 9, in operation S905, the image forming apparatus 100 checks the size of the storage 130. More specifically, the size of the memory installed in the image forming apparatus 100 is checked.

In operation S910, the image forming apparatus 100 senses whether or not a printing command is received from the user. When a printing command is not received (operation S910-N), the process waits until a printing command is received. When a printing command is received from the user in operation S910-Y, the image forming apparatus 100 determines whether or not the received printing command is a duplex printing command in operation S915.

When the received printing command is determined not to be a duplex printing command in operation S915-N, the image forming apparatus 100 prints received printing data in operation S950.

When the received printing command is determined to be a duplex printing command in operation S915-Y, the image forming apparatus 100 determines whether or not waiting is caused from the image former 170 in operation S920. That is, the image forming apparatus 100 determines whether or not the current engine waiting time is too short to execute the print command in the second duplex printing mode.

As a result of determination, when waiting is not caused from the image former 170 in operation S920-N, the image forming apparatus 100 sets the second duplex printing mode without separate settings in operation S925 since it is determined that the image forming apparatus 100 is able to print the received printing data in the second duplex printing mode with the current performance. The image forming apparatus 100 then prints the received printing data in operation S950.

When it is determined that waiting is caused from the image former 170 in operation S920-Y, the image forming apparatus 100 calculates an engine waiting time according to the status of the received printing data and the performance of the image forming apparatus 100 in operation S930 since it is determined that the image forming apparatus 100 is not able to print the received printing data in the second duplex printing mode with the current performance. The criteria used to calculate the engine waiting time may include for example a copy mode, a resolution of the printing data, and an image size of the printing data.

In operation S935, based on the calculated engine waiting time (or a paper interval), the image forming apparatus 100 determines whether or not it is advantageous to change the duplex printing mode. More specifically, the image forming apparatus 100 may determine whether or not the calculated engine waiting time is greater than a predetermined engine waiting time T3.

When the calculated engine waiting time is determined to be greater than the predetermined engine waiting time T3 in operation S935-N, the image forming apparatus 100 changes from the second duplex printing mode to the first duplex printing mode and prints the printing data in operations S945 and S950 since it is advantageous to change the duplex printing mode.

Alternatively, when the calculated engine waiting time is determined to be smaller than the predetermined engine waiting time T3 in operation S935-Y, the image forming apparatus 100 adjusts the engine waiting time and the paper interval and prints the printing data in operations S940 and S950 since it is advantageous to adjust the engine waiting time (and/or the paper interval) without changing the duplex printing mode.

Accordingly, in the image forming method according to this exemplary embodiment of the present general inventive concept, printing may be performed in the duplex printing mode capable of efficiently minimizing a printing time according to the features of printing data and the performance of the image forming apparatus 100. The image forming method as illustrated in FIG. 9 may be executed by the image forming apparatus 100 having a configuration as illustrated in FIG. 1, and may be executed by image forming apparatuses having other configurations.

Figure 10:
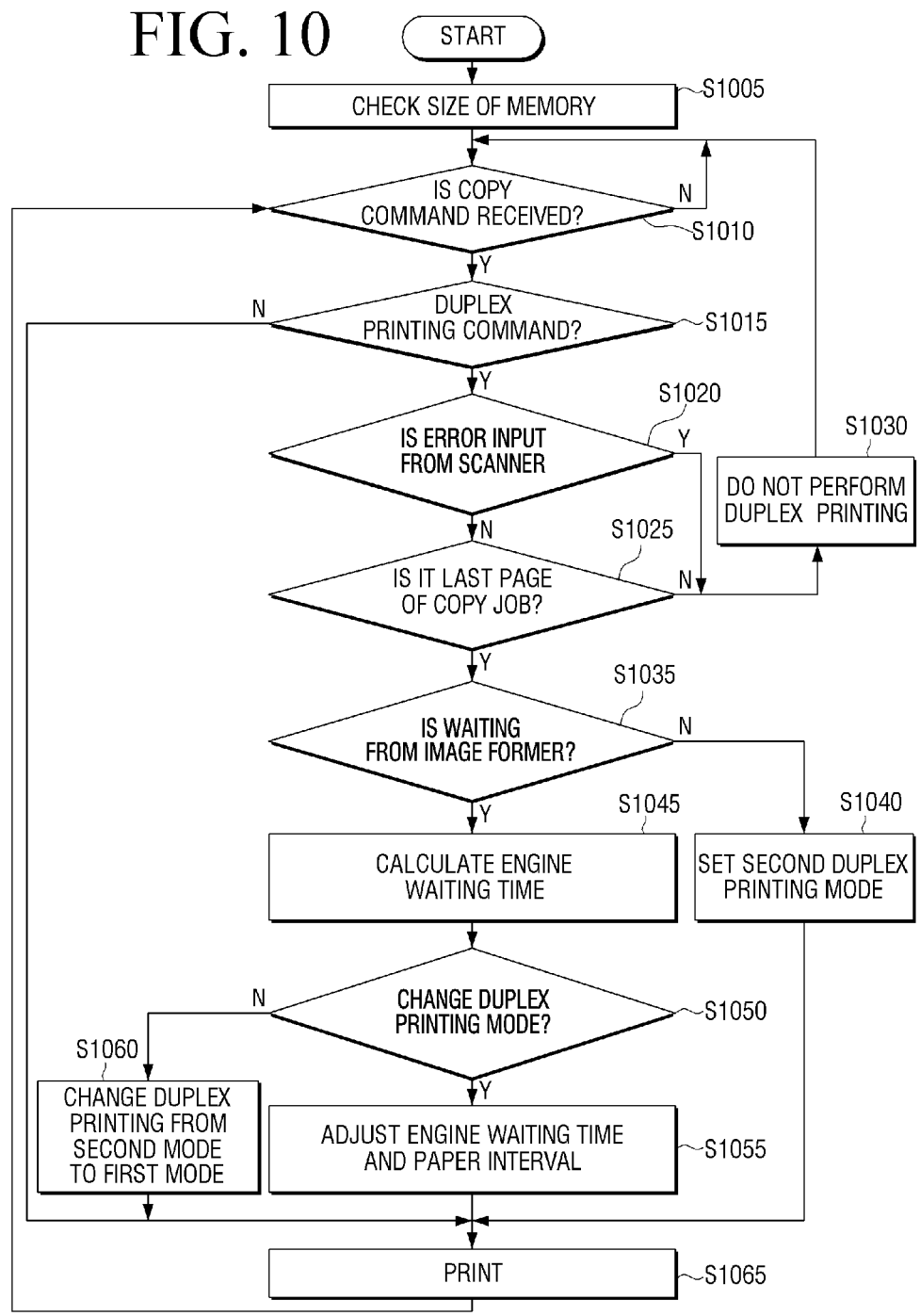
FIG. 10 is a flow chart illustrating an image forming method in detail when the user gives a copy command according to an exemplary embodiment of the present general inventive concept.

FIG. 10 is a flow chart illustrating an image forming method in detail when the user gives a copy command.

With reference to FIG. 10, in operation S1005, the image forming apparatus 100 checks the size of the storage 130. More specifically, the size of the memory installed in the image forming apparatus 100 is checked.

In operation S1010, the image forming apparatus 100 senses whether or not a copy command is received from the user. When no copy command is received (operation S1015-N), the method waits until a copy command is received. When a copy command is received from the user in operation 5910-Y, the image forming apparatus 100 determines whether or not the received copy command requires duplex printing in operation S1015.

When the received copy command is determined to not require duplex printing in operation S1015-N, the image forming apparatus 100 prints a scanned image in operation S1065.

When the received copy command is determined to require duplex printing in operation S1015-Y, the image forming apparatus 100 determines whether or not an error is input from the scanner in operation S1020. When it is determined that an error is input from the scanner in operation S1020-Y, the image forming apparatus 100 determines in operation 1030 that duplex printing should not be performed. When it is determined that no error is input from the scanner in operation S1020-N, the image forming apparatus 100 determines whether or not scanning is performed for the last page in operation S1025.

When printing is performed for the last page in operation S1025-Y, the image forming apparatus 100 determines not to perform duplex printing in operation S1030.

When printing is not performed for the last page in operation S1025-N, the image forming apparatus 100 determines whether or not waiting is caused from the image former 170 in operation S1035. That is, the image forming apparatus 100 determines whether or not the current engine waiting time is too short to execute the print command in the second duplex printing mode.

As a result of determination, when waiting is not caused from the image former 170 in operation S1035-N, the image forming apparatus 100 sets the second duplex printing mode without separate settings in operations S1040 since it is determined that the image forming apparatus 100 is able to print the scan data in the second duplex printing mode with the current performance. In operation S1065, the image forming apparatus 100 prints the scan data.

When waiting is caused from the image former 170 in operation S1035-Y, the image forming apparatus 100 calculates an engine waiting time according to the status of the scan data and the performance of the image forming apparatus 100 in operation S1045 since it is determined that the image forming apparatus 100 is not able to print the scan data in the second duplex printing mode with the current performance. The criteria used to calculate the engine waiting time may include for example a copy mode, a resolution of the printing data, and an image size of the printing data.

In operation S1050, based on the calculated engine waiting time (or a paper interval), the image forming apparatus 100 determines whether or not it is advantageous to change the duplex printing mode. More specifically, the image forming apparatus 100 may determine whether or not the calculated engine waiting time is greater than a predetermined engine waiting time T3.

When the calculated engine waiting time is greater than the predetermined engine waiting time T3 in operation S1050-N, the image forming apparatus 100 changes from the second duplex printing mode to the first duplex printing mode and prints the scan data in operations S1060 and S1065 since it is advantageous to change the duplex printing mode.

Alternatively, when the calculated engine waiting time is determined to be smaller than the predetermined engine waiting time T3 in operation S1050-Y, the image forming apparatus 100 adjusts the engine waiting time and the paper interval and prints the scan data in operations S1055 and S1065 since it is advantageous to adjust the engine waiting time (and/or the paper interval) without changing the duplex printing mode.

Accordingly, in the copy method according to this exemplary embodiment of the present general inventive concept, printing may be performed in the duplex printing mode capable of efficiently minimizing a printing time according to the features of scan data and the performance of the image forming apparatus 100. The copy method as illustrated in FIG. 10 may be executed by the image forming apparatus 100 having a configuration as illustrated in FIG. 1, and may be executed by image forming apparatuses having other configurations.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a semiconductor memory, a read-only memory (ROM), a random-access memory (RAM), a USB memory, a memory card, a Blu-Ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus having a plurality of duplex printing modes which are separated according to a processing unit of printing paper, the image forming apparatus comprising:
   an input unit to receive printing data;
   a controller to determine an engine waiting time according to a feature of the input printing data and a performance of the image forming apparatus, and to determine a duplex printing mode to be applied to the printing data from among the plurality of duplex printing modes based on the determined engine waiting time;
   an image processor to perform image-processing of the input printing data; and
   an image former to print the image-processed printing data based on the determined duplex printing mode and the determined engine waiting time.

2. The image forming apparatus of claim 1, wherein the duplex printing modes comprise:
   a first duplex printing mode to perform duplex printing on a single sheet of printing paper at a time; and
   a second duplex printing mode to perform duplex printing on two sheets of printing paper at a time.

3. The image forming apparatus of claim 2, wherein the image processor generates two printing images sequentially for each sheet of printing paper when the determined duplex printing mode is the first duplex printing mode, and
   the image processor generates four printing images alternately for two sheets of printing paper at a time when the determined duplex printing mode is the second duplex printing mode.

4. The image forming apparatus of claim 3, wherein the image former completes duplex printing on a first sheet of printing paper and then performs duplex printing on a second sheet of printing paper when the determined duplex printing mode is the first duplex printing mode, and
   the image former performs printing on a first side of a second sheet of printing paper between printing on the first side of the first sheet of printing paper and printing on a second side of the first sheet of printing paper when the determined duplex printing mode is the second duplex printing mode.

5. The image forming apparatus of claim 2, wherein the controller determines that the duplex printing mode to be applied to the printing data becomes the second duplex printing mode when the determined engine waiting time is smaller than a predetermined value, and
   the controller determines that the duplex printing mode to be applied to the printing data becomes the first duplex printing mode when the determined engine waiting time is greater than the predetermined value.

6. The image forming apparatus of claim 1, wherein the controller determines the engine waiting time in consideration of at least one of an image processing speed of the image processor, a memory size of the image forming apparatus, a copying method, and a resolution of the printing data.

7. The image forming apparatus of claim 6, wherein the controller determines a printing command cycle, and determines the engine waiting time additionally in consideration of a weighting corresponding to the determined printing command cycle.

8. The image forming apparatus of claim 1, further comprising:

a paper feeder to feed the printing paper into the image former along a paper feeding path, wherein the controller controls the paper feeder to delay feeding of the printing paper into the image former when the determined engine waiting time is greater than a default printing waiting time.

9. The image forming apparatus of claim 8, wherein the paper feeder re-feeds the printing paper into the image former after the image former has printed on a first side of the printing paper, and the controller controls the paper feeder to change a time of re-feeding the printing paper into the image former or change a moving speed of the printing paper on the paper feeding path when the determined engine waiting time is greater than the default printing waiting time.

10. The image forming apparatus of claim 1, further comprising:

a communication interface to communicate with a host device, wherein the input unit receives the printing data from the host device through the communication interface.

11. The image forming apparatus of claim 1, further comprising:

a scanner to scan a document and generates a scan image, wherein the input unit receives the scan image generated by the scanner as the printing data.

12. The image forming apparatus of claim 1, wherein the plurality of duplex printing modes comprises:

a first duplex printing mode; and a second duplex printing mode, the second duplex printing mode having a higher printing speed than the first duplex printing mode, wherein the controller determines the engine waiting time to maintain printing of the printing data in the second duplex printing mode.

13. An image forming method of an image forming apparatus having a plurality of duplex printing modes which are separated according to a processing unit of printing paper, the method comprising:

receiving printing data;

determining an engine waiting time according to a feature of the input printing data and performance of the image forming apparatus;

determining a duplex printing mode to be applied to the printing data from among the plurality of duplex printing modes based on the determined engine waiting time;

performing image-processing of the input printing data; and printing the image-processed printing data based on the determined duplex printing mode and the determined engine waiting time.

14. The image forming method of claim 13, wherein the duplex printing modes comprise:

a first duplex printing mode to perform duplex printing on a single sheet of printing paper at a time; and a second duplex printing mode to perform duplex printing on two sheets of printing paper at a time.

15. The image forming method of claim 14, wherein performing of image-processing comprises:

generating two printing images sequentially on each printing paper when the determined duplex printing mode is the first duplex printing mode; and generating four printing images alternately on two sheets of printing paper at a time when the determined duplex printing mode is the second duplex printing mode.

16. The image forming method of claim 15, wherein printing of the image-processed printing data comprises:

performing duplex printing on a single sheet of printing paper at a time when the determined duplex printing mode is the first duplex printing mode, and performing printing on a first side of a second sheet of printing paper between printing on a first side of a first sheet of printing paper and printing on a second side of the first sheet of printing paper when the determined duplex printing mode is the second duplex printing mode.

17. The image forming method of claim 14, wherein determining of the duplex printing mode comprises:

determining the duplex printing mode to be applied to the printing data as the second duplex printing mode when the determined engine waiting time is smaller than a predetermined value, and determining the duplex printing mode to be applied to the printing data as the first duplex printing mode when the determined engine waiting time is greater than the predetermined value.

18. The image forming method of claim 13, wherein determining of the duplex printing mode comprises:

determining the engine waiting time in consideration of at least one of an image processing speed of an image processor, a memory size of the image forming apparatus, a copying method, and a resolution of the printing data.

19. The image forming method of claim 18, wherein determining of the duplex printing mode comprises:

determining a printing command cycle; and determining the engine waiting time additionally in consideration of a weighting corresponding to the determined printing command cycle.

20. The image forming method of claim 13, wherein printing of the image-processed printing data comprises:

delaying feeding the printing paper into an image former when the determined engine waiting time is greater than a default printing waiting time.

21. The image forming method of claim 13, wherein printing of the image-processed printing data comprises:

changing a time of re-feeding the printing paper into the image former after printing on a first side of the printing paper or changing a moving speed of the printing paper on the paper feeding path when the determined engine waiting time is greater than the default printing waiting time.

22. The image forming method of claim 13, wherein receiving of the printing data comprises:

receiving the printing data from a host device.

23. The image forming method of claim 13, wherein receiving of the printing data comprises:

scanning a document;

generating a scan image; and receiving the generated scan image as the printing data.

24. A non-transitory computer-readable recording medium to contain computer-readable codes as a program to execute the method of claim 13.

* * * * *